May 27, 1958 E. H. MEIER ET AL 2,836,718

PULSE AMPLITUDE MULTIPLIER

Filed May 12, 1954

INVENTORS.
EDWIN H. MEIER,
ROBERT G. HESTER,
BY
Henry Heyman
ATTORNEY.

United States Patent Office 2,836,718
Patented May 27, 1958

2,836,718

PULSE AMPLITUDE MULTIPLIER

Edwin H. Meier, Los Angeles, and Robert G. Hester, Pacoima, Calif., assignors to Hughes Aircraft Company, Culver City, Calif., a corporation of Delaware Application May 12, 1954, Serial No. 429,280

6 Claims. (Cl. 250—27)

Figure 1:
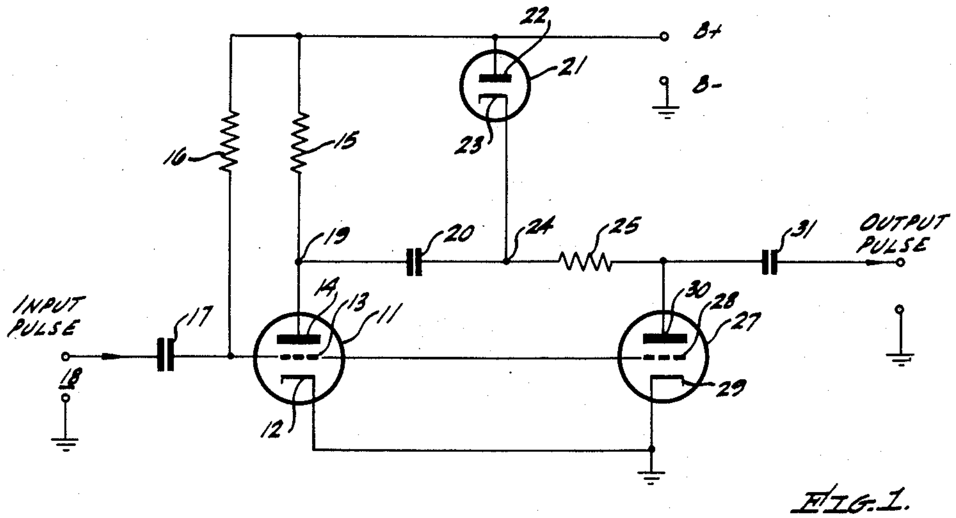

This invention relates to pulse generators, and more particularly to a pulse generator producing a pulse having a voltage amplitude greater than that of the voltage of the power supply for the generator.

In certain electronic systems, such as in radar systems, high voltage pulses are required to energize particular electronic circuits. For this purpose, a power supply must be furnished which has a fairly high voltage rating. Where unfavorable space requirements exist, such as in airplanes, further valuable space must be utilized to house the increased number and size of electronic parts comprising such a high voltage power supply.

It is therefore an object of this invention to provide an improved pulse generator producing high voltage pulses without the necessity of having a high voltage power supply to effect considerable savings in space requirements for the generator power supply.

It is a further object of this invention to provide an improved pulse generator capable of being triggered by a low voltage pulse to produce an output pulse having a substantially higher voltage than the power supply voltage used in connection therewith.

It is a still further object of this invention to provide an improved pulse generator capable of producing a pulse having a voltage amplitude almost twice that of its power supply which can be cascaded to produce an output pulse having a voltage amplitude more than twice that of the power supply voltage used in connection therewith.

Briefly, the pulse generator of this invention comprises a pair of normally conducting triodes which have their anodes connected through a capacitor having first and second plates. A diode connects the first plate of the capacitor, and therefore one of the anodes, to the power supply of the generator. The diode is adapted to prevent the first plate from going below the voltage of the power supply. A trigger pulse is applied simultaneously to the grids of the triodes to stop conduction through these tubes. The increase in anode voltage of the tube connected to the second plate of the capacitor is transferred to the first plate causing the diode to cease conduction. This allows the entire increase in voltage amplitude at the second plate to be transferred to the first plate of the capacitor. The pulse thus formed will have a voltage amplitude almost twice that of the voltage of the power supply for the generator.

Figure 2:
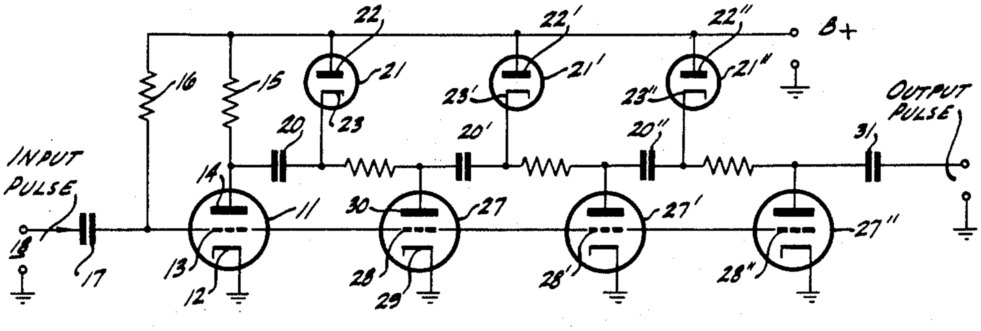

The above enumerated objects and other objects of the invention will become apparent from the following description taken in conjunction with the accompanying drawings made a part of this specification. In the drawings:

Fig. 1 is a schematic diagram of a preferred embodiment of the pulse multiplier of this invention; and Fig. 2 is a schematic diagram to illustrate cascaded units of the pulse multiplier of Fig. 1.

Referring to the drawing, in which like reference characters are used to indicate like parts throughout, and more particularly to Fig. 1, a grid-controlled electron switching tube 11, having at least a cathode 12, control grid 13, and anode 14, is coupled to a power supply source (not shown) indicated as B+. A plate load resistor 15 is connected between anode 14 and B+; and a grid return resistor 16 is connected between grid 13 and B+ to establish the bias on tube 11 in the absence of an input pulse. This method of biasing provides a quick recovery time between pulses. To apply a pulse to tube 11, a coupling capacitor 17 is connected between an input terminal 18 and grid 13.

For convenience, the junction between resistor 15 and anode 14 will hereafter be referred to as junction 19. A storage capacitor 20 is connected between junction 19 and the cathode 23 of a clamping diode 21. The anode 22 of diode 21 is connected to B+. The junction 24 of cathode 23 and capacitor 20 is connected through a plate load resistor 25 to the anode 30 of a second grid-controlled electron switching tube 27. Tube 27 has substantially the same characteristics as tube 11. The grid 28 of tube 27 is connected to the grid 13 of tube 11 in order that pulses may be applied to both tubes simultaneously. The cathode 29 of tube 27 is connected to ground with cathode 12 of tube 11. Tube 27 is utilized as a switching means to allow the voltage at junction 24 to appear at anode 30 when tube 27 is cut off.

Initially, when no input pulse is applied at terminal 18, tubes 11, 21 and 27 are conducting. The resistance of tube 11 is small in comparison to resistor 15 so that the potential at junction 19 is slightly positive with respect to ground. Junction 24 is essentially at B+ because of the low resistance of diode 21. Capacitor 20 thus has the anode voltage of tube 11 on one plate and substantially the power supply potential B+ on its other plate.

To initiate an output pulse, a negative pulse of sufficient amplitude to stop conduction through tubes 11 and 27 is applied to the grids of said tubes, whereupon the voltage at junction 19 rises to B+. This voltage rise adds to the power supply potential B+ at junction 24, which in turn causes diode 21 to stop conducting. The voltage at junction 24 increases from B+ by an amount equal to the difference between the voltages at junction 19 before and after tube 11 cut off. The voltage appearing at junction 24 will also appear at anode 30 of tube 27, since tube 27 now appears as an open circuit. The output pulse may be taken off at anode 30 of tube 27 by conventional means, such as capacitor 31.

The pulse amplifier just described may be cascaded, as shown in Fig. 2.

Referring to Fig. 2, the anode 30 of tube 27 is connected through capacitor 20′ to the cathode 23′ of a diode 21′. Cathode 23′ is resistively connected to the anode 30′ of a tube 27′, which in turn is connected through a capacitor 20″ to the cathode 23″ of another diode 21″. Cathode 23″ is resistively connected to the anode 30″ of tube 27″. The anodes 22′ and 22″ of diodes 21′ and 21″ are connected to B+. The control grids 13, 28, 28′ and 28″ of tubes 11, 27, 27′ and 27″ are all connected together, and their respective cathodes grounded. Thus connected, capacitors 20′, and 20″ each serve as storage capacitors in the same manner as capacitor 20 in Fig. 1.

Before a trigger pulse is applied to grids of the tubes, all the tubes are conducting. The cathodes of all the diodes are substantially at B+. When a trigger pulse cuts off tubes 11, 27, 27′ and 27″, the voltage at cathode 23 rises above B+ as previously described. The increased voltage appearing at cathode 23 is transferred via capacitor 20′ to add to the B+ voltage at cathode 23′. Similarly, this increased voltage at cathode 23′ is transferred via capacitor 20″ to add to the B+ voltage at cathode 23″. In this manner, it has been found that an output pulse having an amplitude of over 1,000 volts was obtained with a B+ voltage of 300 volts in an arrangement of the type shown in Fig. 2. In one such arrangement, this was achieved with the following circuit components:

| | |
|---|---|
| Resistor **16** | 220,000 ohms. |
| Other resistors | 15,000 ohms. |
| Capacitors **20**, **20′**, **20″** | 4 microfarads. |
| Tubes **11**, **27**, **27′**, **27″** | Type 5687. |
| Diodes **21**, **21′**, **21″** | Type 6W4. |

While there has been here described one embodiment of the present invention, it will be manifest to one skilled in the art that various changes and modifications may be made therein without departing from the spirit of the invention. It is therefore aimed in the appended claims to cover all such changes and modifications as fall within the spirit and scope of the invention.

What is claimed is:

1. A pulse generator comprising a first electron discharge device including an anode, cathode and control electrode, means for applying a D.-C. supply voltage to the anode of said first electron discharge device, said first electron discharge device being normally conductive; unidirectional conductive means connected to said D.-C. voltage applying means, said unidirectional conductive means being poled so as to be normally conductive; a second electron discharge device including an anode, cathode and control electrode; a connection between the anode of said second electron discharge device and said unidirectional conductive means, whereby said unidirectional conductive means operatively couples said second electron discharge device to said D.-C. voltage applying means to render said second electron discharge device normally conductive; a capacitor having a first and second terminal, said first terminal being connected to the anode of said first electron discharge device and said second terminal being connected to said connection, whereby said unidirectional conductive device maintains the potential at said second terminal at least at the voltage supplied by said voltage applying means; and means to apply a signal pulse to said first and second electron discharge devices, said first and second electron discharge devices being made nonconductive during the occurrence of said signal pulse to cause the voltage appearing at said first electron discharge device to rise to the voltage supplied by said D.-C. voltage applying means, said voltage rise being transferred to said second terminal to render said unidirectional conductive means nonconductive, whereby a voltage pulse is provided at said second terminal which is greater than the voltage from said D.-C. voltage applying means.

2. A pulse generator for producing an output pulse in response to an input pulse, comprising a source of positive voltage, a first switching means, said first switching means being coupled to said source and adapted to be controllably operated by said input pulse to produce an increased output potential; a capacitor having a first and a second terminal, said first terminal being coupled to said first switching means and responsive to the output potential thereof; a second switching means, said second switching means being connected between said voltage source and said second terminal and adapted to prevent the voltage at said second terminal from going below a predetermined voltage amplitude; a third switching means, said third switching means being coupled to said second terminal and providing an output thereto and also adapted to be controllably operated simultaneously with said first switching means by said input pulse to permit the voltage at said second terminal to increase along with the increase in voltage amplitude on the first terminal of said capacitor.

3. A circuit for producing an output pulse in response to an input pulse comprising a first electron tube having at least an anode, a cathode and a control grid, said cathode being connected to ground, means coupled to said first electron tube for applying said input pulse, means coupled to said first electron tube for biasing said control grid, a source of positive voltage, a first anode load resistor, said first anode load resistor being connected between said positive voltage source and the anode of said first electron tube, said first electron tube being adapted to cut off when said input pulse reaches a predetermined amplitude, thereby causing the amplitude of the voltage on said anode to approach the magnitude of the said positive voltage; a second electron tube having at least an anode and a cathode, said anode being connected to said positive voltage source, a storage capacitor, said storage capacitor being connected between the cathode of said second electron tube and the anode af said first electron tube, said capacitor transferring any increase in voltage on the anode of said first electron tube to the cathode of said second electron tube, a third electron tube having at least an anode, cathode and control grid, said control grid being connected to the control grid of said first electron tube and said cathode being connected to ground, a second anode load resistor, said second anode load resistor being connected between the cathode of said second electron tube and the anode of said third electron tube, said third electron tube being adapted to cut off simultaneously with said first electron tube, thereby increasing the amplitude of the voltage on the anode of said third electron tube to a value substantially that on the cathode of said second electron tube, whereby a pulse having an amplitude greater than said positive voltage source is produced.

4. A pulse generator as described in claim 1 further comprising a second unidirectional conductive means connected to said D.-C. voltage applying means, said unidirectional conductive means being poled so as to be normally conductive; a third electron discharge device; a second connection between said third electron discharge device and said second unidirectional conductive means, whereby said unidirectional conductive means operatively couples said third electron discharge device to said D.-C. voltage applying means to render said second electron discharge device normally conductive; a second capacitor having a first and second terminal, said first terminal being connected to said first connection and said second terminal being connected to said second connection, whereby said second unidirectional conductive device maintains the potential at said second terminal of said second capacitor at the voltage supplied by said D.-C. voltage applying means; means to apply said signal pulse to said third electron discharge device, said third electron discharge device being made nonconductive during the occurrence of said signal pulse to cause the voltage appearing at said third electron discharge device to rise to the voltage supplied by said D.-C. voltage applying means, and said increase in voltage appearing at said second terminal of said first capacitor further appearing at said first terminal of said second capacitor, said voltage rise being transferred to said second terminal of said second capacitor to render said second unidirectional conductive means nonconductive, whereby a voltage pulse is provided at said second terminal of said second capacitor having a magnitude more than twice the voltage from said D.-C. voltage applying means.

5. A circuit for generating output pulses in response to input pulses comprising means providing a positive voltage, first switch means responsive to said input pulses for selectively providing high potential levels, capacitive means having first and second terminals, said first terminal being coupled to said first switch means, unidirectional conducting means coupling said means providing positive voltage to the second terminal of said capacitive means to maintain said second terminal at a minimum voltage substantially that of the positive voltage, and second switch means responsive to said input pulses for selectively providing high potential levels, said second switch means being coupled to said unidirectional device to permit said capacitive means to add the voltage at said first switch means to the voltage at the second terminal of said capacitive means to produce an output pulse at said second terminal.

6. A circuit for generating output pulses in response to input pulses comprising means providing a positive voltage, a first electron discharge tube having an anode, cathode and control grid, the control grid of said first electron discharge tube being responsive to said input pulses and the anode of said tube being coupled to said means providing a positive voltage, a capacitor having first and second terminals, the first terminal being coupled to the anode of said first electron discharge tube, a unidirectional conducting tube having at least an anode and cathode, the anode of said unidirectional conducting tube being coupled to said means providing a positive voltage and the cathode being coupled to the second terminal of said capacitor, and a second electron discharge tube having at least an anode, cathode and control grid, the control grid of said electron discharge tube being responsive to said input pulses and the anode of said second electron discharge tube being coupled to the second terminal of said capacitor and to the cathode of said unidirectional conducting tube.

References Cited in the file of this patent

UNITED STATES PATENTS

| | | |
|---|---|---|
| 2,105,902 | Cawein | Jan. 18, 1938 |
| 2,500,536 | Goldberg | Mar. 14, 1950 |
| 2,570,014 | Schenau et al. | Oct. 2, 1951 |
| 2,582,490 | Land | Jan. 15, 1952 |
| 2,621,302 | Friend | Dec. 9, 1952 |
| 2,667,053 | Nims | Apr. 27, 1954 |
| 2,695,955 | Casey | Nov. 30, 1954 |